(12) United States Patent
Viola et al.

(10) Patent No.: US 8,249,344 B2
(45) Date of Patent: *Aug. 21, 2012

(54) GRAMMATICAL PARSING OF DOCUMENT VISUAL STRUCTURES

(75) Inventors: Paul A. Viola, Kirkland, WA (US); Michael Shilman, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 599 days.

This patent is subject to a terminal disclaimer.

(21) Appl. No.: 11/173,280

(22) Filed: Jul. 1, 2005

(65) Prior Publication Data

US 2007/0003147 A1    Jan. 4, 2007

(51) Int. Cl.
   *G06K 9/34*    (2006.01)
   *G06K 9/72*    (2006.01)

(52) U.S. Cl. ............ 382/173; 382/180; 382/229

(58) Field of Classification Search .......... 348/645; 382/176, 175, 180, 229, 173
See application file for complete search history.

(56) References Cited

U.S. PATENT DOCUMENTS

| | | | |
|---|---|---|---|
| 5,235,650 A | 8/1993 | Jeong | |
| 5,373,566 A | 12/1994 | Murdock | |
| 5,432,868 A | 7/1995 | Obata et al. | |
| 5,442,715 A | 8/1995 | Gaborski et al. | |
| 5,479,523 A | 12/1995 | Gaborski et al. | |
| 5,625,707 A | 4/1997 | Diep et al. | |
| 5,687,286 A | 11/1997 | Bar-Yam | |
| 5,749,066 A | 5/1998 | Nussbaum | |
| 5,787,194 A | 7/1998 | Yair | |
| 5,930,746 A | 7/1999 | Ting | |
| 5,987,171 A * | 11/1999 | Wang | 382/173 |
| 6,041,299 A | 3/2000 | Schuster et al. | |
| 6,178,398 B1 | 1/2001 | Peterson et al. | |
| 6,363,171 B1 | 3/2002 | Kovacs | |
| 6,542,635 B1 | 4/2003 | Hu et al. | |
| 6,678,415 B1 | 1/2004 | Popat et al. | |
| 6,766,320 B1 | 7/2004 | Wang et al. | |
| 6,950,753 B1 | 9/2005 | Rzhetsky et al. | |
| 6,996,295 B2 * | 2/2006 | Tyan et al. | 382/305 |
| 7,107,207 B2 | 9/2006 | Goodman | |
| 7,197,497 B2 * | 3/2007 | Cossock | 707/7 |
| 7,327,883 B2 | 2/2008 | Polonowski | |

(Continued)

FOREIGN PATENT DOCUMENTS

JP     6215184     8/1994

(Continued)

OTHER PUBLICATIONS

Chen et al., "Detecting and Reading Text in Natural Scenes", Jun. 27-Jul. 2, 2004.*

(Continued)

*Primary Examiner* — Anand Bhatnagar
*Assistant Examiner* — Soo Park
(74) *Attorney, Agent, or Firm* — Lee & Hayes, PLLC

(57) ABSTRACT

A two-dimensional representation of a document is leveraged to extract a hierarchical structure that facilitates recognition of the document. The visual structure is grammatically parsed utilizing two-dimensional adaptations of statistical parsing algorithms. This allows recognition of layout structures (e.g., columns, authors, titles, footnotes, etc.) and the like such that structural components of the document can be accurately interpreted. Additional techniques can also be employed to facilitate document layout recognition. For example, grammatical parsing techniques that utilize machine learning, parse scoring based on image representations, boosting techniques, and/or "fast features" and the like can be employed to facilitate in document recognition.

19 Claims, 10 Drawing Sheets

U.S. PATENT DOCUMENTS

| | | | |
|---|---|---|---|
| 2003/0010992 A1 | 1/2003 | Lempkowski et al. | |
| 2003/0169925 A1 | 9/2003 | Polonowski | |
| 2003/0171915 A1 | 9/2003 | Barklund et al. | |
| 2004/0111408 A1 | 6/2004 | Caudill et al. | |
| 2004/0167778 A1 | 8/2004 | Valsan et al. | |
| 2005/0015251 A1 | 1/2005 | Pi et al. | |
| 2005/0044106 A1* | 2/2005 | Duncan et al. | 707/104.1 |
| 2005/0111737 A1 | 5/2005 | Das et al. | |
| 2005/0259866 A1 | 11/2005 | Jacobs et al. | |
| 2006/0045337 A1 | 3/2006 | Shilman et al. | |
| 2006/0095248 A1 | 5/2006 | Menezes et al. | |
| 2006/0245641 A1 | 11/2006 | Viola et al. | |
| 2006/0245654 A1* | 11/2006 | Viola et al. | 382/229 |
| 2006/0280370 A1 | 12/2006 | Viola et al. | |
| 2007/0003147 A1 | 1/2007 | Viola et al. | |

FOREIGN PATENT DOCUMENTS

| | | |
|---|---|---|
| JP | 2002133389 | 5/2002 |
| JP | 2002269499 | 9/2002 |
| RU | 2234734 C1 | 8/2004 |
| RU | 2234126 C2 | 10/2004 |
| WO | WO02099545 | 12/2002 |

OTHER PUBLICATIONS

International Search Report for PCT Application No. PCT/US06/26140 dated Jul. 23, 2007, 2 pgs.

C. D. Manning, et al., Foundations of Statistical Natural Language Processing. The MIT Press, 1999.

Tobias Schefer, et al., Active Hidden Markov Models for Information Extraction. In Advances in Intelligent Data Analysis, 4th International Conference, IDA 2001, 2001.

P. Chou, "Recognition of Equations Using a 2-D Stochastic Context-Free Grammar," in SPIE Conference on Visual Communications and Image Processing, Philadelphia, PA, 1989.

M. Kay, "Algorithm Schemata and Data Structures in Syntactic Processing," pp. 35-70, 1986.

Michael Shilman, et al., Spatial Recognition and Grouping of Text and Graphics, Eurographics Workshop on Sketch-Based Interfaces and Modeling, 2004.

Michael Shilman, et al., Recognition and Grouping of Handwritten Text in Diagrams and Equations, IWFHR 2004, Sep. 2004, Toyko, Japan.

Vinajak R. Borkar, et al., Automatically extracting structure from free text addresses, 2000, In Bulletin of the IEEE Computer Society Technical committee on Data Engineering. IEEE.

Remco Bouckaert, Low level information extraction: A bayesian network based approach, 2002, In Proc. TextML 2002, Sydney, Australia.

Claire Cardie, et al., Proposal for an interactive environment for information extraction, 1998, Technical Report TR98-1702, 2.

Rich Caruana, et al., High precision information extraction, Aug. 2000, In KDD-2000 Workshop on Text Mining.

M. Collins, Discriminative training methods for hidden markov models : Theory and experiments with perceptron algorithms, 2002, In Proceedings of Empirical Methods in Natural Language Processing (EMNLP02).

Corinna Cortes, et al., Support-vector networks. Machine Learning, 1995, 20(3):273{297.

Y. Freund, et al., Large margin classification using the perceptron algorithm, Machine earning, 37(3):277{296.

Y. Freund, et al., Experiments with a new boosting algorithm, 1996, In International Conference on Machine Learning, pp. 148{156.

T. Kristjansson, et al., Interactive information extraction with constrained conditional random fields, 2004, In Proceedings of the 19th international conference on artificial intelligence, AAAI, pp. 412{418.

John Lafferty, et al., Conditional random fields: Probabilistic models for segmenting and labeling sequence data, 2001, In Proc. 18th International Conf. on Machine Learning, pp. 282{289. Morgan Kaufmann, San Francisco, CA.

M. Marcus, et al., The penn treebank: Annotating predicate argument structure, 1994.

Andrew McCallum, Efficiently inducing features of conditional random fields, 2003, In Nineteenth Conference on Uncertainty in Artificial Intelligence (UAI03).

Andrew McCallum, et al., Early results for named entity recognition with conditional random fields, feature induction and web-enhanced lexicons, 2003, In Marti Hearst and Mari Ostendorf, editors, HLT-NAACL, Association for Computational Linguistics, Edmonton, Alberta, Canada.

Kamal Nigam, et al., Using maximum entropy for text classification, 1999, In IJCAI'99 Workshop on Information Filtering.

David Pinto, et al., Table extraction using conditional random fields, 2003, In Proceedings of the ACM SIGIR.

L.R. Rabiner, A tutorial on hidden markov models and selected applications in speech recognition, 1989, In Proc. of the IEEE, vol. 77, pp. 257{286.

Fei Sha, et al., Shallow parsing with conditional random fields. In Marti Hearst and Mari Ostendorf, editors, 2003, HLT-NAACL: Main Proceedings, pp. 213{220, Association for Computational Linguistics, Edmonton, Alberta, Canada.

J. Stylos, et al., Citrine:providing intelligent copy-and-paste, 2005, In Proceedings of ACM Symposium on User Interface Software and Technology (UIST 2004), pp. 185{188.

B. Tasker, et al., Max-margin parsing, 2004, In Empirical Methods in Natural Language Processing (EMNLP04).

S. Mao, et al., Document structure analysis algorithms: A literature survey, Jan. 2003, vol. 5010, pp. 197-207, In Proc. SPIE Electronic Imaging.

M. Krishnamoorthy, et al., Syntactic segmentation and labeling of digitized pages from technical journals, 1993, IEEE Transactions on Pattern Analysis and Machine Intelligence. vol. 15, pp. 737-747.

J. Kim, et al., Automated labeling in document images, Jan. 2001, In Document Recognition and Retrieval VIII, vol. 4307.

D. Niyogi, et al., Knowledge-based derivation of dobument logical structure, 1995, In Third International Conference on Document Analysis and Recognition, Montreal, Canada.

A. Conway, Page grammars and page parsing. a syntactic approach to document layout recognition, 1993, in Proceedings of the Second International Conference on Document Analysis and Recognition. Tsukuba Science City . pp. 761-764. Japan.

E. G. Miller, et al., Ambiguity and constraint in mathematical expression recognition, 1998, In Proceedings of the National Conference of Artificial Intelligence. American Association of Artificial Intelligence.

T. Tokuyasu, et al., Turbo recognition: a statistical approach to layout analysis, 2001, in Proceedings of the SPIE, pp. 123-129, vol. 4307, San Jose, CA.

T. Kanungo, et al., Stochastic language model for style-directed physical layout analysis of documents, 2003, In IEEE Transactions on Image Processing, vol. 5, No. 5.

D. Blostein, et al., Applying compiler techniques to diagram recognition, 2002, In Proceedings of the Sixteenth International Conference on Pattern Recognition, pp. 123-136, vol. 3, 2002.

J. F. Hull, Recognition of mathematics using a two dimensional trainable context-free grammar, Jun. 1996, Master's thesis, MIT.

N. Matsakis, Recognition of handwritten mathematical expressions, May 1999, Master's thesis, Massachusetts Institute of Technology, Cambridge, MA.

J. Lafferty, et al., Conditional random fields: Probabilistic models for segmenting and labeling sequence data, 2001, In Proc. 18th International Conf. on Machine Learning, pp. 282-289, Morgan Kaufmann, San Francisco, CA.

E. Charniak, et al., Edge-based best-first chart parsing, 1998, In Proceedings of the Fourteenth National Conference on Artificial Intelligence, pp. 127-133.

D. Klein, et al., A* parsing: Fast exact viterbi parse selection, 2001, Stanford University, Tech. Rep. dbpubs/2002-16.

Y. Freund, et al., A decision-theoretic generalization of on-line learning and an application to boosting, 1995, In Computational Learning Theory: Eurocolt '95, Springer-Verlag, pp. 23-37.

I. Philips, et al., Cd-rom document database standard, 1993, in Proceedings of 2nd International Conference on Document Analysis and Recognition.

P. Viola, et al., Rapid object detection using a boosted cascade of simple features, 2001, In Proceedings of the IEEE Conference on Computer Vision and Pattern Recoanition.

T. Breuel, High performance document layout analysis, in 2003 Symposium on Document Image Understanding Technology, Greenbelt Maryland.

R. Zanibbi, et al., A survey of table recognition: Models, observations, transformations, and inferences, 2004, International Journal of Document Analysis and Recognition, pp. 1-16, vol. 7, No. 1.

K.-F. Chan, et al., Mathematical expression recognition: a survey, 2000, International Journal on Document Analysis and Recognition, pp. 3-15, vol. 3.

E. Charniak, Statistical techniques for natural language parsing, 1997, AI Magazine.

M. Kay, Chart generation, 1996, in Proceedings of the 34th conference on Association for Computational Linguistics. Association for Computational Linguistics, pp. 200-204.

M. Viswanathan, et al., Document recognition: an attribute grammar approach, Mar. 1996, In Proc. SPIE vol. 2660, p. 101-111, Document Recognition III, Luc M. Vincent; Jonathan J. Hull; Eds., pp. 101-111.

Translated Chinese Office Action mailed Apr. 6, 2011 for Chinese Patent Application No. 200680031501.X, a counterpart foreign application of U.S. Appl. No. 11/173,280, 6 pgs.

Microsoft Press Computer Dictionary, 2nd Edition, Microsoft Press, 1994, p. 129.

Translated Chinese Office Action mailed Aug. 22, 2011 for Chinese patent application No. 200680031501.X, a counterpart foreign application of U.S. Appl. No. 11/173,280, 6 pages.

Namboodiri et al, "Robust Segmentation of Unconstrained Online Handwritten Documents", Proc Fourth Indian Conf on Computer Vision, Graphics Image Processing (ICVGIP), Dec. 2004, pp. 165-170.

Translated Japanese Office Action mailed Dec. 2, 2011 for Japanese patent application No. 2008-520352, a counterpart foreign application of U.S. Appl. No. 11/173,280, 4 pages.

* cited by examiner

FIG. 4

GRAMMATICAL PARSING OF DOCUMENT VISUAL STRUCTURES

BACKGROUND

As time progresses, people become more dependent on computers to help with both work and leisure activities. However, computers operate in a digital domain that requires discrete states to be identified in order for information to be processed. This is contrary to humans who function in a distinctly analog manner where occurrences are never completely black or white, but in between shades of gray. Thus, a central distinction between digital and analog is that digital requires discrete states that are disjunct over time (e.g., distinct levels) while analog is continuous over time. As humans naturally operate in an analog fashion, computing technology has evolved to alleviate difficulties associated with interfacing humans to computers (e.g., digital computing interfaces) caused by the aforementioned temporal distinctions.

Technology first focused on attempting to input existing typewritten or typeset information into computers. Scanners or optical imagers were used, at first, to "digitize" pictures (e.g., input images into a computing system). Once images could be digitized into a computing system, it followed that printed or typeset material should also be able to be digitized. However, an image of a scanned page cannot be manipulated as text or symbols after it is brought into a computing system because it is not "recognized" by the system, i.e., the system does not understand the page. The characters and words are "pictures" and not actually editable text or symbols. To overcome this limitation for text, optical character recognition (OCR) technology was developed to utilize scanning technology to digitize text as an editable page. This technology worked reasonably well if a particular text font was utilized that allowed the OCR software to translate a scanned image into editable text.

Although text was "recognized" by the computing system, important additional information was lost by the process. This information included such things as formatting of the text, spacing of the text, orientation of the text, and general page layout and the like. Thus, if a page was double-columned with a picture in the upper right corner, an OCR scanned page would become a grouping of text in a word processor without the double columns and picture. Or, if the picture was included, it typically ended up embedded at some random point between the texts. This is even more of a problem when different document construction standards are utilized. A typical OCR technique is generally unable to "convert" or properly recognize structure from another document standard. Instead, the resulting recognition attempts to confine or force recognized parts into its associated standard. When this occurs, an OCR process usually inputs "unknown" markers, such as question marks, into the recognized portions to indicate that it cannot process these components of the document.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

Systems and methods are provided that employ grammatical parsing to facilitate in recognition of document structures. A two-dimensional representation of a document is leveraged to extract a hierarchical structure that facilitates recognition of the document. The visual structure of the document is grammatically parsed utilizing two-dimensional adaptations of statistical parsing algorithms. This allows recognition of layout structures (e.g., columns, authors, titles, footnotes, etc.) and the like such that structural components of the document can be accurately interpreted. Additional techniques can also be employed to facilitate document layout recognition. For example, grammatical parsing techniques that utilize machine learning, parse scoring based on image representations, boosting techniques, and/or "fast features" and the like can be employed to facilitate in document recognition. This provides for efficient document recognition with substantially improved accuracy.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

BRIEF DESCRIPTION OF THE DRAWINGS

FIG. 4 is an illustration of an example page from the UWIII database in accordance with an aspect of an embodiment.

DETAILED DESCRIPTION

Figure 1:
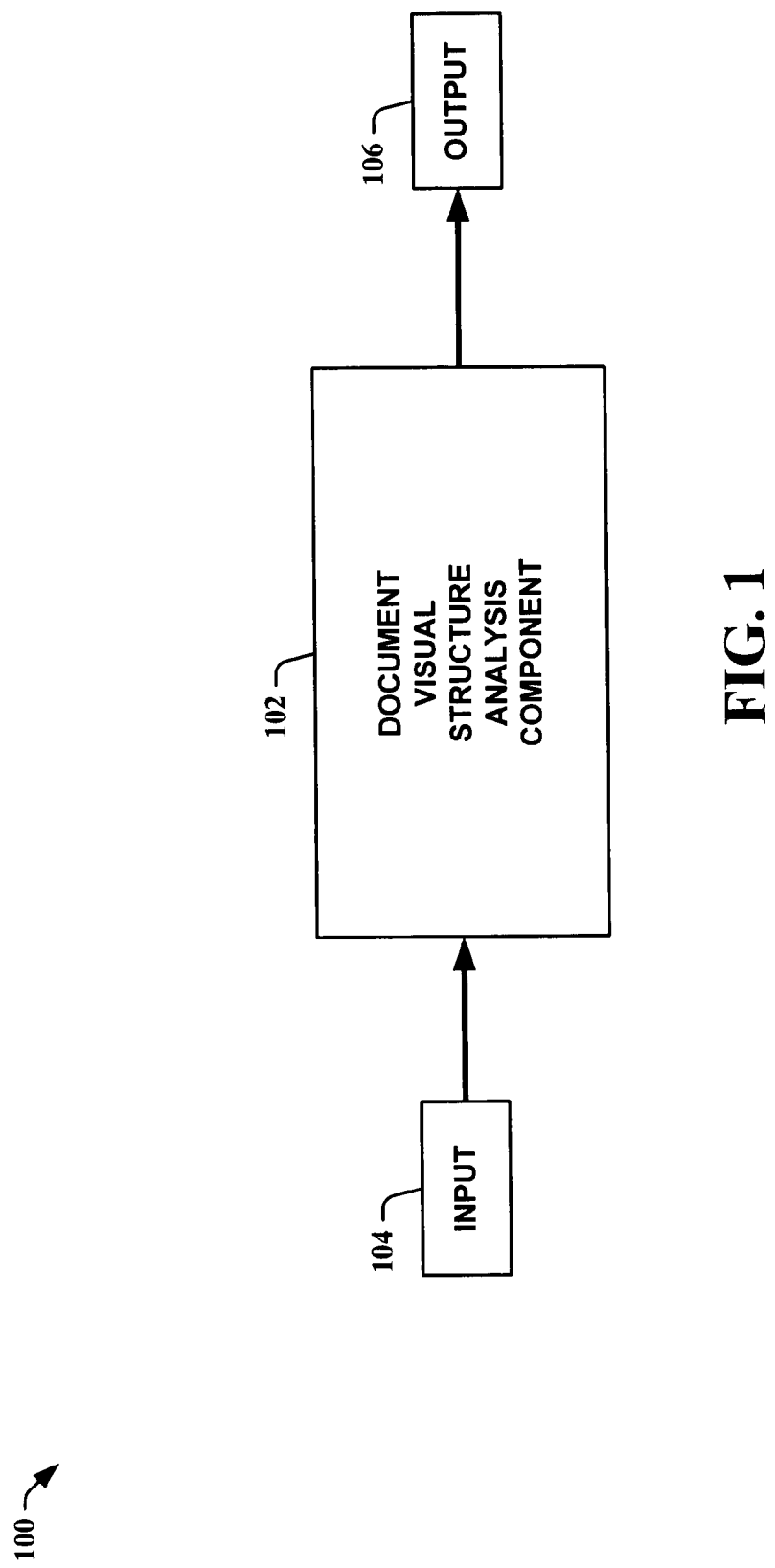
FIG. 1 is a block diagram of a document visual structure analysis system in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details.

In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

Systems and methods are provided to facilitate in the recognition of documents via utilization of visual structures. The inherent hierarchical structure of the document (e.g., document→pages→sections→columns→paragraphs, etc.) is recognized utilizing two-dimensional parsing mechanisms that employ grammar-based techniques. By further utilizing machine learning processes with the grammatical parsing mechanisms, the efficiency of recognizing documents can be substantially improved while still providing high accuracy. Image scoring techniques can also be utilized to facilitate in increasing parsing speed and efficiency. Selection of fast features of the document as well as boosting techniques for parse learning can also be utilized to increase productivity of the systems and methods.

Grammatical parsing is utilized for processing computer languages and natural languages. In the case of computer languages, the grammar is unambiguous and given the input there is one and only one valid parse. In the case of natural languages, the grammar is ambiguous and given the input sequence there are a very large number of potential parses. The desire in statistical natural language parsing is to employ machine learning to yield a scoring function which assigns the highest score to the correct parse. In the systems and methods provided herein, the visual structure layout is modeled as a grammar, and a global search for an optimal parse is performed based on a grammatical cost function. Machine learning can then be utilized to discriminatively select features and set all parameters in the grammatical parsing process, adapting to a variety of visual structure layouts.

In FIG. 1, a block diagram of a document visual structure analysis system 100 in accordance with an aspect of an embodiment is shown. The document visual structure analysis system 100 is comprised of a document visual structure analysis component 102 that receives an input 104 and provides an output 106. The document visual structure analysis component 102 utilizes a non-generative grammatical model of a visual structure layout of a document to facilitate in determining an optimal parse tree for the visual structure layout. The input 104 includes, for example, a visual layout of a page of a document. The document visual structure analysis component 102 parses the input 104 utilizing a grammatical parsing process that parses the visual structure of a document to provide the output 106. The output 106 can be comprised of, for example, an optimal parse tree for the document visual structure layout. A globally learned "reference" grammar can also be established to provide parsing solutions for different tasks without requiring additional grammar learning.

Figure 2:
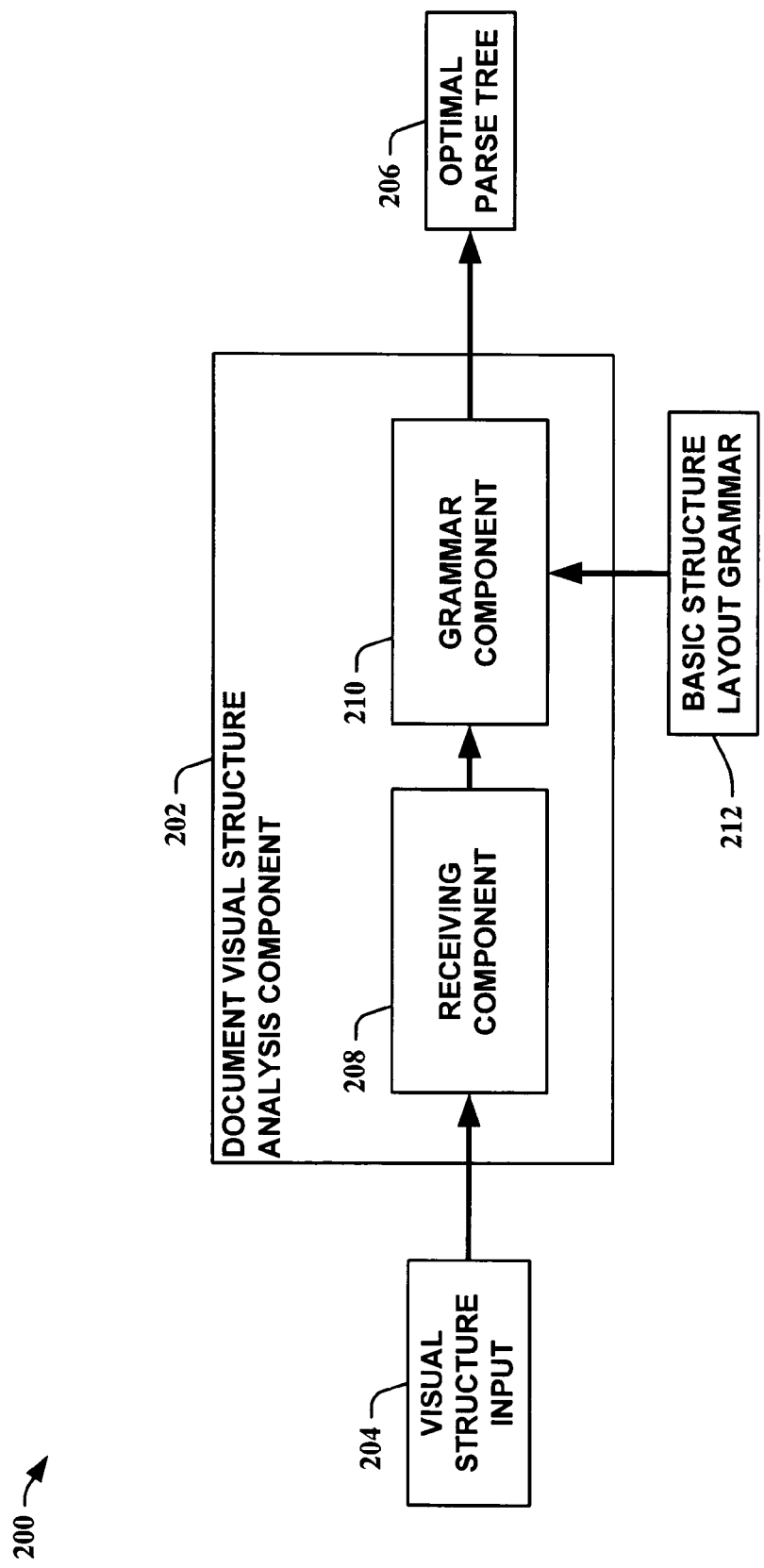
FIG. 2 is another block diagram of a document visual structure analysis system in accordance with an aspect of an embodiment.

Looking at FIG. 2, another block diagram of a document visual structure analysis system 200 in accordance with an aspect of an embodiment is illustrated. The document visual structure analysis system 200 is comprised of a document visual structure analysis component 202 that receives a visual structure input 204 and provides an optimal parse tree 206. The document visual structure analysis component 202 utilizes a discriminative grammatical model of a document visual structure layout. The document visual structure analysis component 202 is comprised of a receiving component 208 and a grammar component 210. The receiving component 208 receives the visual structure input 204 and relays it 204 to the grammar component 210. In other instances, the functionality of the receiving component 208 can be included in the grammar component 210, allowing the grammar component 210 to directly receive the visual structure input 204. The grammar component 210 also receives a basic structure layout grammar 212. The basic structure layout grammar 212 provides an initial visual structure grammar framework for the document layout. The grammar component 210 parses the visual structure input 204 to obtain an optimal parse tree 206. It 210 accomplishes this via utilization of a grammatical parsing process that parses the visual structure of a document. The grammar component 210 employs a dynamic programming process to determine a globally optimal parse tree. This prevents the optimal parse tree 206 from only being evaluated locally, yielding improved global results.

Figure 3:
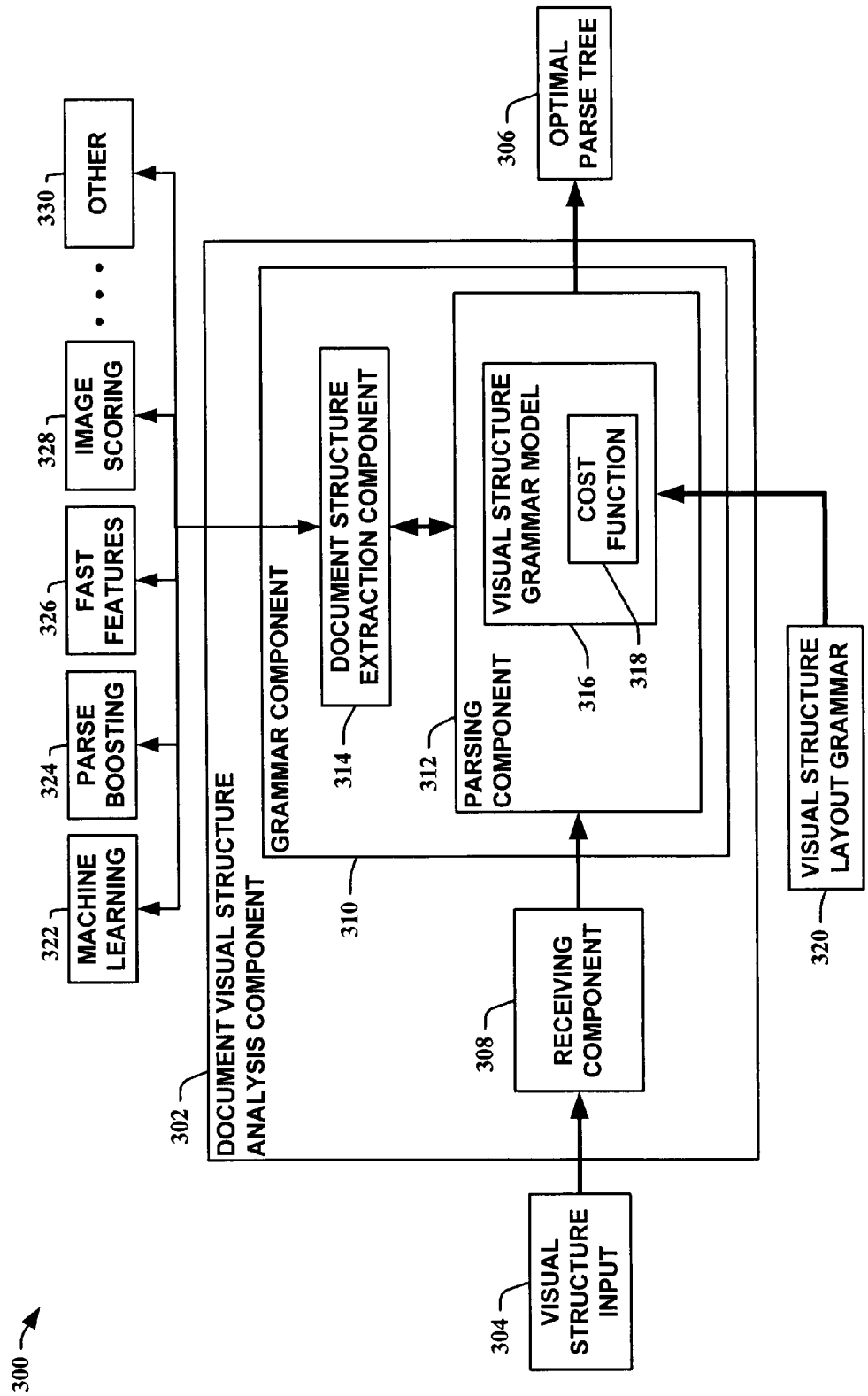
FIG. 3 is yet another block diagram of a document visual structure analysis system in accordance with an aspect of an embodiment.

Turning to FIG. 3, yet another block diagram of a document visual structure analysis system 300 in accordance with an aspect of an embodiment is depicted. The document visual structure analysis system 300 is comprised of a document visual structure analysis component 302 that receives a visual structure input 304 and provides an optimal parse tree 306. The document visual structure analysis component 302 utilizes a discriminative grammatical model of a document visual structure layout for parsing. The document visual structure analysis component 302 is comprised of a receiving component 308 and a grammar component 310. The grammar component 310 is comprised of a parsing component 312 and a document structure extraction component 314. The parsing component 312 is comprised of a visual structure grammar model 316 with a grammatical cost function 318. The visual structure input 304 includes, for example, a visual layout of a document page. The receiving component 308 receives the visual structure input 304 and relays it 304 to the parsing component 312. In other instances, the functionality of the receiving component 308 can be included in the parsing component 312, allowing the parsing component 312 to directly receive the visual structure input 304. The parsing component 312 parses the document visual structure from the visual structure input 304 based initially on a visual structure layout grammar 320. The parsing component 312 interacts with the document structure extraction component 314 to specifically facilitate in extracting visual structure information from the visual structure input 304.

The document structure extraction component 314 utilizes complex local and/or global features to facilitate the parsing component 312 in parsing the visual structure input 304. It 314 can utilize various optional mechanisms to augment visual structure layout parsing by the parsing component 312 including, but not limited to, machine learning 322, parse boosting 324, fast features 326, image scoring 328, and/or other 330 and the like. Other 330 represents additional efficiency and/or visually oriented mechanisms that facilitate to expedite and/or enhance the parsing component 312.

For example, machine learning 322 can be provided by the document structure extraction component 314 to facilitate the parsing component 312 in order to generate a chart. It 312 then converts the chart into a subsequent set of labeled examples that are relayed to a classification process. The classification process utilizes the subsequent set of labeled examples along with the machine learning to train a set of classifiers. The classification process then determines identifying properties between positive and negative examples. The identifying properties allow the classifiers to facilitate in assigning proper costs to correct and/or incorrect parses. The parsing component 312 then utilizes the set of classifiers in the grammatical cost function 318 of the visual structure grammar model 316 to facilitate in scoring sub-parses of the subsequent set of labeled examples. In this manner, the process continues iteratively until an optimal parse tree 306 is obtained (e.g., no higher scoring parse tree is obtained or no lower cost parse tree is obtained).

Similarly, the parse boosting mechanism 324 can be provided to the parsing component 312 to facilitate in learning correct parses more efficiently. A fast feature mechanism 326 can be provided to compute parse images via computation of integral images of document features and/or utilization of constellations of integral images to enhance the parsing efficiency. The image scoring mechanism 328 can facilitate parsing by providing scores of parsed images for the grammatical cost function 318. These mechanisms 322-330 are optional and not required for parsing of the visual structure input 304.

When utilizing constellations of integral images, rather than a single integral image for an entire page of a document, an integral image is computed for each element of the page (e.g., character, word, and/or line as appropriate, etc.). Attention can be focused by including only the critical characters in a feature computation. The systems and methods herein can also utilize computed integral images of document features as well. For example, document features such as large white space rectangles, vertical alignments of bounding boxes, and/or horizontal alignments of text lines and the like can be utilized.

Thus, by utilizing the integral image, it is possible to quickly compute the number of white and/or black pixels within an image rectangle. Computing the integral image for an image is expensive, but once it is computed, rectangular sums can be quickly computed. When a set of objects is given that may or may not be in an image, there is an exponential number of images that may be rendered from the image (power set P(N)). Rendering these images and computing the rectangle sums for each rendered image is prohibitively expensive. So, instead, the integral image is rendered for each of the objects and is denoted as "integral image constellations." Thus, the rectangle sum for any subset of the images is the sum of the rectangle sums from the constellations.

Two-Dimensional Parsing

While there are a number of competing parsing algorithms, one simple yet generic framework is called "chart parsing" (see, M. Kay, "Algorithm schemata and data structures in syntactic processing," pp. 35-70, 1986). Chart parsing attempts to fill in the entries of a chart C(A, R). Each entry stores the best score of a non-terminal A as an interpretation of the sub-sequence of terminals R. The cost of any non-terminal can be expressed as the following recurrence:

$$C(A, \mathcal{R}_0) = \min_{\substack{A \to BC \\ \mathcal{R}_1 \cap \mathcal{R}_2 = \emptyset \\ \mathcal{R}_1 \cup \mathcal{R}_2 = \mathcal{R}_0}} C(B, \mathcal{R}_1) + C(C, \mathcal{R}_2) + l(A \to BC), \quad \text{(Eq. 1)}$$

where {BC} ranges over all productions for A, and $R_0$ is a subsequence of terminals (denoted as a "region"), and $R_1$ and $R_2$ are subsequences which are disjoint and whose union is $R_0$ (i.e., they form a "partition"). Essentially, the recurrence states that the score for A is computed by finding a low cost decomposition of the terminals into two disjoint sets. Each production is assigned a cost (or loss or negative log probability) in a table, $l(A \to BC)$. The entries in the chart (sometimes called edges) can be filled in any order, either top down or bottom up. The complexity of the parsing process arises from the number of chart entries that must be filled and the work required to fill each entry. The chart constructed while parsing a linear sequence of N terminals using a grammar including P non-terminals has $O(PN^2)$ entries (there are $$\frac{1}{2}\binom{N}{2} \in O(N^2)$$

contiguous subsequences, {i, j} such that $0 \leq i < j$ and $j < N$). Since the work required to fill each entry is O(N), the overall complexity is $O(PN^3)$.

Unfortunately, a direct application of chart parsing to two-dimensional arrangements of terminals requires exponential time. The key problem is that the terminals no longer have a linear sequential order. Returning to Equation (1), the region $R_0$ is now a subset, and $R_1$ and $R_2$ are subsets which are disjoint and whose union is $R_0$ (i.e., they form a partition). The size of the chart can be analyzed—which is $O(P|P(N)|)$, where P(N) is set of all subsets of N terminals. Since there are an exponential number of subsets the algorithm is exponential.

Hull introduced a geometric criterion which prunes the search in cases where the geometric component of the cost is too high (see, J. F. Hull, "Recognition of mathematics using a two-dimensional trainable context-free grammar," Master's thesis, MIT, June 1996). Miller and Viola introduced a heuristic based on convex hulls which rejects regions $R_1$, $R_2$ that violate chull($R_1$)∩$R_2$=∅ or chull($R_2$)∩$R_1$=∅ (see, E. G. Miller and P. A. Viola, "Ambiguity and constraint in mathematical expression recognition," in *Proceedings of the National Conference of Artificial Intelligence*, American Association of Artificial Intelligence, 1998). Calling these sets regions is now appropriate, since each set lies within a convex region of the page. It is worth noting that if the terminals lie along a line (and therefore have a strict linear ordering) the convex hull criterion yields the $O(N^2)$ regions and is equivalent to the linear sequence used in conventional parsing.

By making use of the convex hull constraint, as well as other geometric constraints, the set of subsets considered during parsing can be significantly reduced. These constraints combine to yield near $O(N^3)$ complexity on most types of printed documents.

Document Layout Analysis

One goal of document layout analysis is to determine the information necessary to convert a scanned document into a fully editable input file for a document preparation program such as, for example, LaTeX and/or a word processor and the like. While the text in a scanned file can be easily extracted using OCR, this information is not sufficient to produce an easily editable file. Additional information such as paragraph boundaries, columns, justification, and, more importantly, reading flow are necessary as well. This document structure information is also often missing from portable document files (PDF) and Postscript files. Whether for scans, PDF, and/or Postscript, the addition of document structure information yields a living document that can be repaginated, reformatted, and/or edited and the like. Thus, having such a capability greatly increases the usefulness of the document.

Document preparation programs frequently divide the printed page into sections. Each section has some number of columns and each column has some number of paragraphs. This recursive structure is expressed as a grammar in TABLE 1 below. Knowledge of this structure is sufficient to accurately produce an editable file from a scanned document.

TABLE 1

An Example Grammar Which
Can Be Used To Describe Printed Pages (Page → ParList)
(ParList → Par ParList)
(ParList → Par)
(Par → LineList)
(LineList → Line LineList)
(LineList → Line)
(Line → WordList)
(WordList → Word WordList)
(WordList → Word) (Word → terminal)

Figure 4:
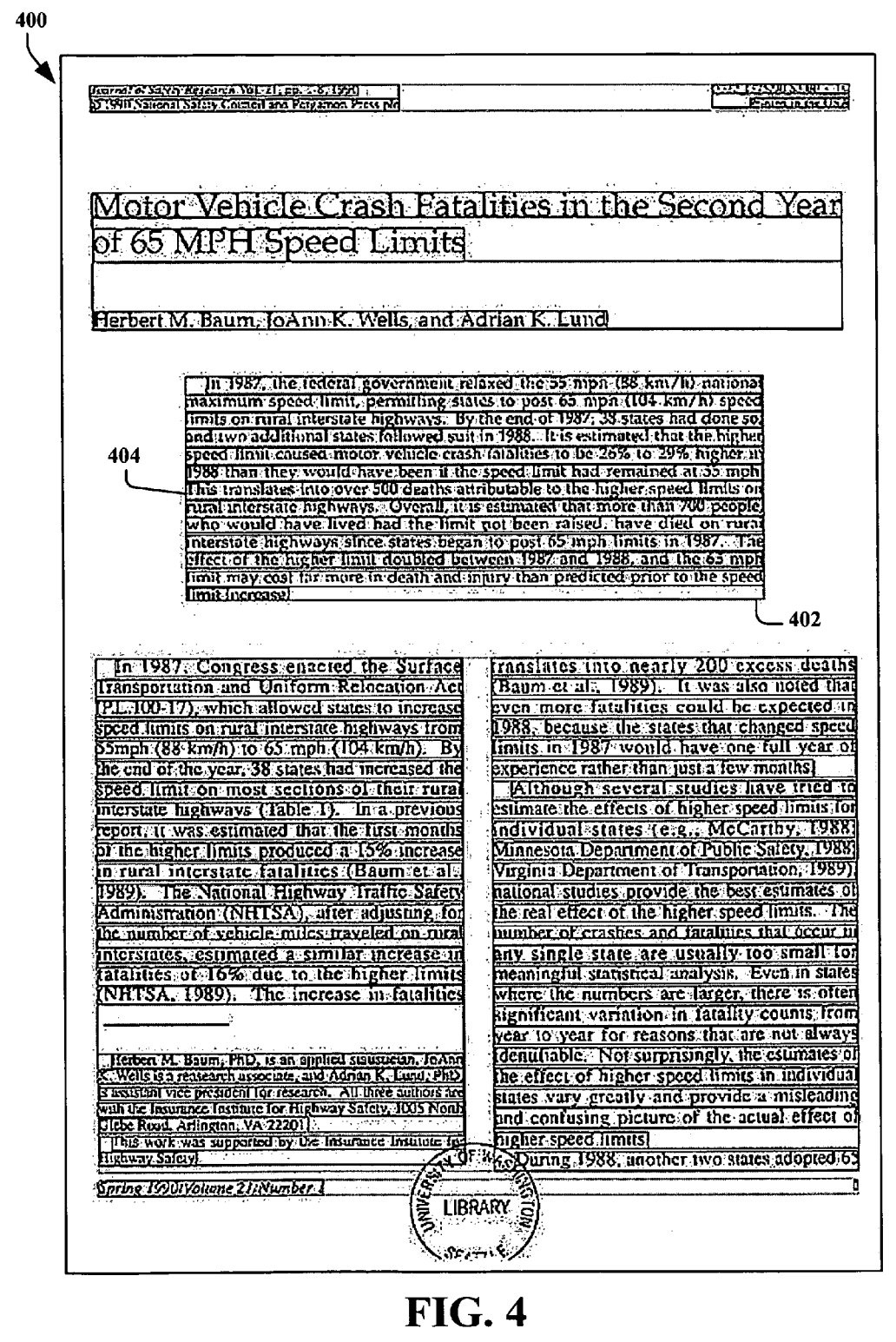

Experiments were performed using the UWIII document image database (see, I. Philips, S. Chen, and R. Haralick, "Cd-rom document database standard," in *Proceedings of 2nd International Conference on Document Analysis and Recognition*, 1993). The database contains scanned documents with ground truth for lines, paragraphs, regions, and reading order. In FIG. 4, an example page 400 from the UWIII database is illustrated. The input to a parsing algorithm is the bounding boxes (e.g., a bounding paragraph box 402 and a bounding line box 404) of the lines. The output is the hierarchical decomposition into sections/columns/paragraphs. For most documents, the ground truth labels are easily converted to the grammar above. Training and evaluation was performed using a set of 60 documents which include pages from research papers, books, and magazines.

Printed Mathematics Interpretation

In the academic research community, almost all new papers are made available either in PDF or Postscript. While convenient for printing, these formats do not support easy reuse or reformatting. One clear example is the included equations, which cannot be extracted, edited, or searched easily. Other examples include tables, footnotes, and bibliographies and the like. The defacto standard for scientific publication is LaTeX, in part because it provides powerful and high-quality mathematics layout. Neither PDF nor Postscript documents provide the information required to reconstruct the LaTeX equations used to generate the original.

Figure 5:
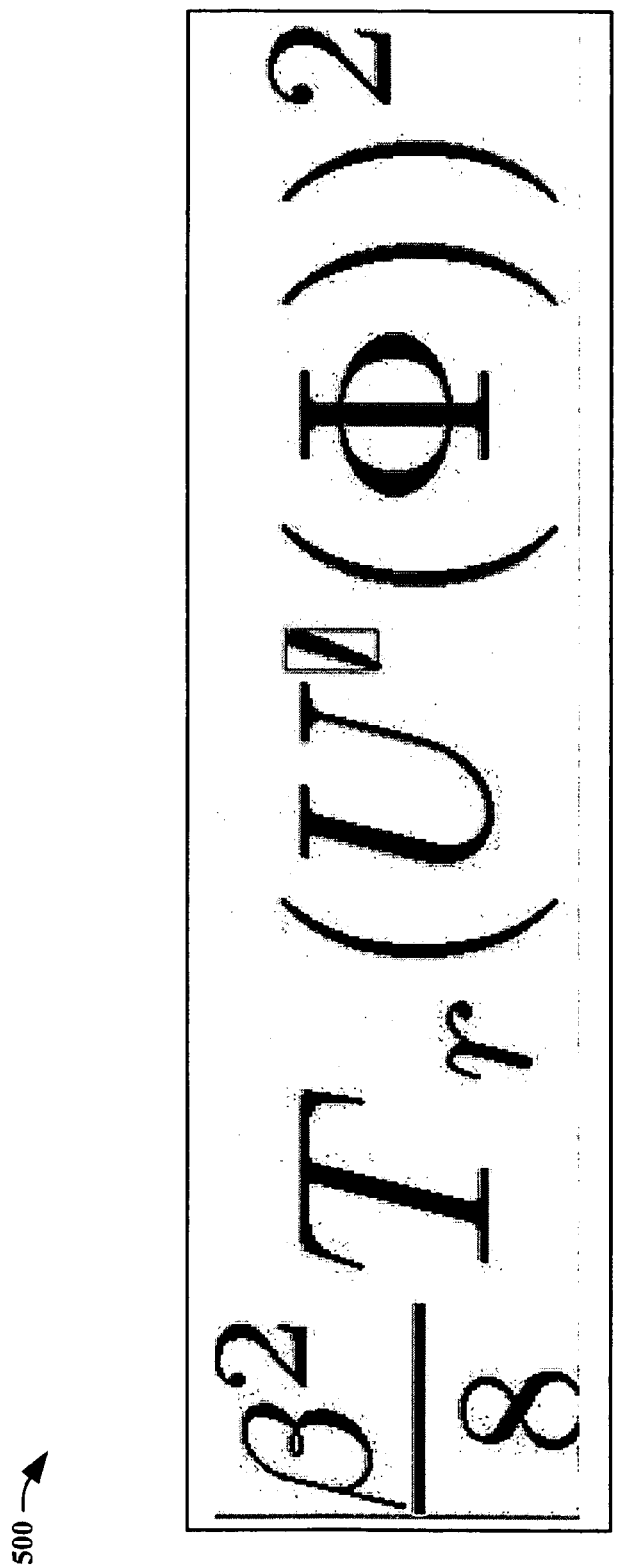
FIG. 5 is an illustration of an example equation used to train a mathematical expression recognizer in accordance with an aspect of an embodiment.

Given a set of training LaTeX documents, a set of LaTeX macros can be used to "instrument" the document rendering process. The result is a set of instrumented device independent (DVI) files which can be processed to extract the bounding boxes of characters on the page and the corresponding LaTeX expression. These macros have been applied to a set of LaTeX files made available from the ArXiv pre-print server (see, FIG. 5—An example equation 500 used to train a mathematical expression recognizer).

After post-processing, the training data is a collection of expressions, each a well-formed syntactic tree of terminals. These trees provide the opportunity to directly induce the grammar, since productions of the grammar are directly observable from the input trees (such a grammar is often called a "tree-bank" grammar). The induced grammar is shown in TABLE 2 below. Note that the terminals of the grammar are not included and are referred to by the nonterminal RawItem. The set of RawItem's are the characters, digits, and symbols used to build up mathematical expressions. The terminals of the grammar are the primitive connected components of black ink.

TABLE 2

A Grammar for
Mathematical Expressions (Expr → Row)
(Row → Row Item)
(Row → Item)
(Item → SubItem)
(Item → FracItem)
(Item → RawItem)
(Item → SupItem)
(FracItem → Row FracItem1)
(FracItem1 → BAR Row)
(SubItem → SupItem Row)
(SubItem → RawItem Row)
(SupItem → RawItem Row)

Unlike other work on mathematical parsing, it is not assumed that the terminals have been segmented and recognized before interpretation begins. Recognition of the terminals is an integral part of the parsing process. Every symbol type has an associated grammatical rule that describes the production of the terminals. For example (RawItem→EQUALS) and (EQUALS→CC1 CC2), which states that the "equals sign" is made up of a pair of connected components. The cost function associated with the EQUALS production must learn to assign low cost to pairs of connected components that look like "=". Overall setting up this problem is mechanically simple. The grammar is created from the example LaTeX files and the features are selected automatically from a larger set of generically valuable features which are defined below.

Features

The features used to learn the production scoring functions are generally applicable and useful for a wide range of tasks. A set of geometric bounding box features have proven valuable for measuring the alignment of components. The first type is related to the bounding boxes of the sets $R_0$, $R_1$, and $R_2$. They measure the position of the corners, $X_i$, $Y_i$ and size, W, H of the box in page coordinates. There are a total of 360 measurement features which are referred to as $\{m_j(R)\}$. A second set of features is combinatorial and relates all pairs of box measurement features: $g(m_j(R_a), m_j(R_b))$, where the a and b are $\{0,1,2\}$ and the function g can be addition, subtraction, multiplication, division, minimum, or maximum. A third set of features measure properties of the bounding boxes of the terminals included in the regions. This includes measuring the minimum, maximum, average, standard deviation, and median of some measurement feature evaluated across all region terminals.

Figure 6:
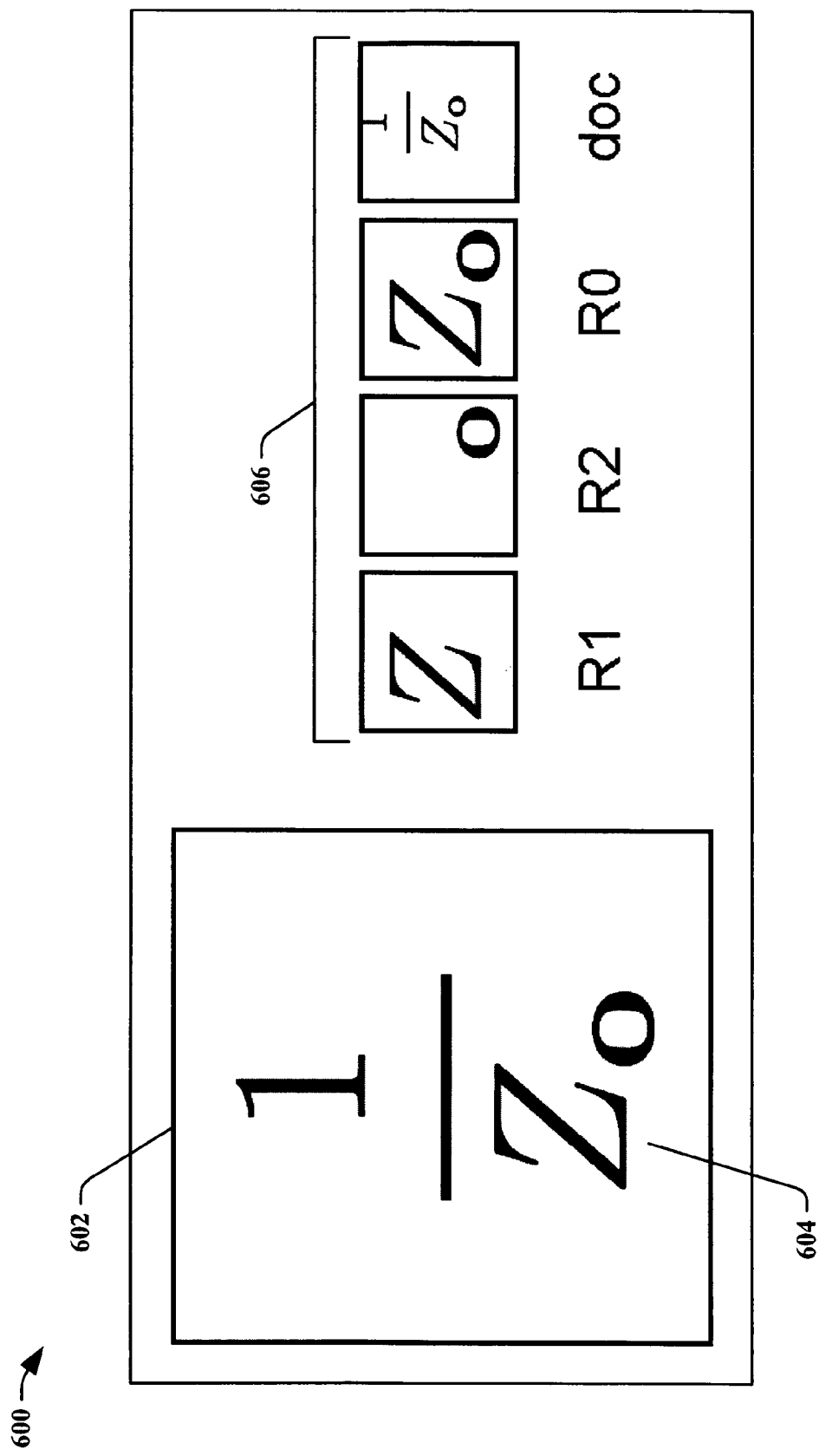
FIG. 6 is an illustration of a mathematical expression in accordance with an aspect of an embodiment.

Additionally, there are a large set of pattern recognition features which are designed to discriminate regions based on visual appearance. These features operate on the rendered images of the terminals in the regions. In FIG. 6, an illustration 600 of a mathematical expression 602 is shown. During parsing, the expression $Z_o$ 604 is encountered and must be interpreted. Four rendered images 606 used as input to the production scoring process are illustrated. Visual features are necessary when the terminals themselves must be recognized based on appearance. The rectangle features proposed by Viola and Jones are adopted (see, P. Viola and M. Jones, "Rapid object detection using a boosted cascade of simple features," in *Proceedings of the IEEE Conference on Computer Vision and Pattern Recognition*, 2001). They are computationally efficient and have proven effective for a wide range of tasks. Each input image is represented by 121 single rectangle features sampled uniformly in location and scale. A much larger set has been used for more difficult image recognition tasks, but these have proven sufficient for these tasks.

Geometric normalization is a critical question when constructing image classification functions. In this case, a reference frame is chosen which normalizes the size and location of $R_0$. The target is for $R_0$ to fill 80% of the visual image. The terminals of $R_1$ and $R_2$ are rendered in this coordinate frame. This provides the image features with an input image containing information about the relative positions of $R_1$ and $R_2$. So for example, if $R_2$ is a subscript, the position of its rendered components will be toward the bottom of the reference frame. Finally the terminals from the entire document are rendered in the reference frame of $R_0$ but with at a much smaller scale. This image encodes document "context" and can be used to perform certain types of local disambiguation.

During parsing every potential region and sub-region is encoded as a set of images. When there are many regions, the image encoding process, which involves image re-scaling, would naively result in great deal of computation. To avoid this computation, the integral image representation introduced by Viola and Jones is used to compute the rectangle filters at any scale with no additional cost.

EXAMPLES

Two sets of experiments were performed using the features described above. The overall process for learning the grammar parameters is described in TABLE 3 below. In each round of learning AdaBoost on decision stumps is used. It provides a very simple mechanism for complexity control (early stopping). It also provides a mechanism for feature selection, since each round of boosting selects a single stump which is in turn associated with a single feature.

TABLE 3

Pseudo-Code for Training Algorithm

| | |
|---|---|
| 0) | Initialize weights to zero for all productions |
| 1) | Parse a set of training examples using current parameters |
| 2) | For each production in the grammar |
| 2a) | Collect all examples from all charts. Examples from the true parse are TRUE. All others are FALSE. |
| 2b) | Train a classifier on these examples. |
| 2c) | Update production weights. New weights are the cumulative sum. |
| 3) | Repeat Step 1. |

Since the early rounds of training are likely to encounter examples which are not representative of the final distribution, AdaBoost is run on schedule of increasing complexity. The first round of boosting selects 2 weak classifiers. The second and third rounds select 4 and 8 classifier respectively. Thereafter, 8 classifiers (and hence 8 features) are selected in each round of parsing.

Evaluation of parsing results is something of an art. Since no system is perfect, it is valuable to define a measure that quantifies the quality of a parse that is mostly correct. One scheme is to measure the recall and precision for each type of production. The ground truth contains many examples of each production. The percentage of times each production is correctly identified is recall. The learned grammar yields a parse for each input example. The percentage of times these productions correspond to the correct parse is the precision.

The UWIII document database includes 57 files split 80-20 in three rounds of cross-validation (see, TABLE 4—Average denotes the average performance across all productions. Weighted average assigns weight in the average based on the number of examples encountered). While performance on the training set is near perfect, the performance on the test set is good but far from perfect. A larger training set and/or changes in the feature representation may improve generalization. For both the document and mathematical equation domains, a typical input with 80 terminals takes approximately 30 seconds to parse on a 1.7 GHz Pentium 4 with 1 GB of RAM.

TABLE 4

Results On The UWIII Document Structure Extraction Task

| | F1 | Precision | Recall |
|---|---|---|---|
| Train: | | | |
| Average | 0.96 | 0.97 | 0.96 |
| Weighted | 0.95 | 0.95 | 0.95 |
| Test: | | | |
| Average | 0.85 | 0.86 | 0.84 |
| Weighted | 0.89 | 0.89 | 0.88 |

The equation database includes 180 expressions and a grammar with 51 different mathematical symbols such as $\lambda$ and $\delta$. The results are shown in TABLE 5 below).

TABLE 5

Results On Mathematical Expression Recognition Task

| | F1 | Precision | Recall |
|---|---|---|---|
| Train: | | | |
| Weighted | 1 | 1 | 1 |
| Test: | | | |
| Weighted | 0.942 | 0.947 | 0.936 |

Instances of the systems and methods provide an analysis framework that can learn to simultaneously segment and recognize components of printed documents. The framework is quite general, in that all parameters of the parsing process are set using a database of training examples. The effectiveness and generality of the framework has been demonstrated by presenting two applications: page layout structure extraction and mathematical expression recognition. In the first case, the input to the algorithm is a collection of lines on the page and the output is the section, column, and paragraph structure. In the second case, the input is a collection of connected components on the page and the output is a set of recognized mathematical symbols and the LaTeX code necessary to reproduce the input. While the final systems are quite different, very few modifications to the learning and parsing process are necessary to produce an accurate recognition system.

Figure 7:
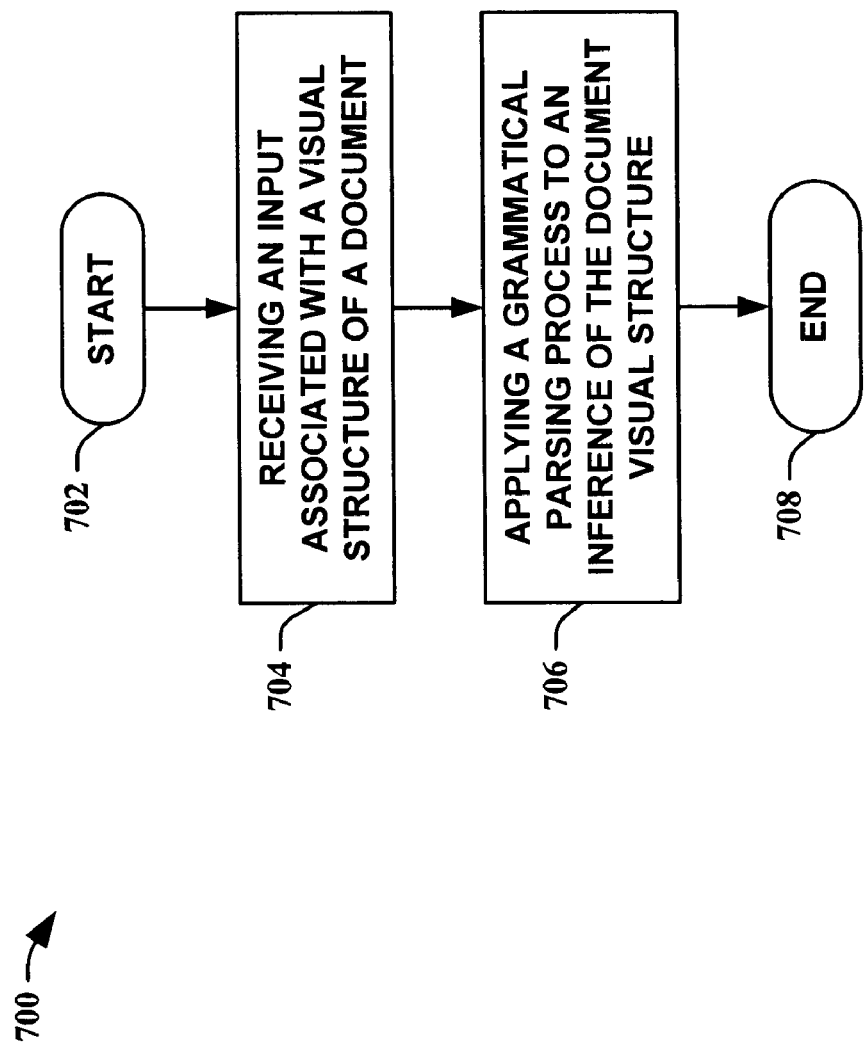
FIG. 7 is a flow diagram of a method of facilitating document visual structure analysis in accordance with an aspect of an embodiment.
Figure 8:
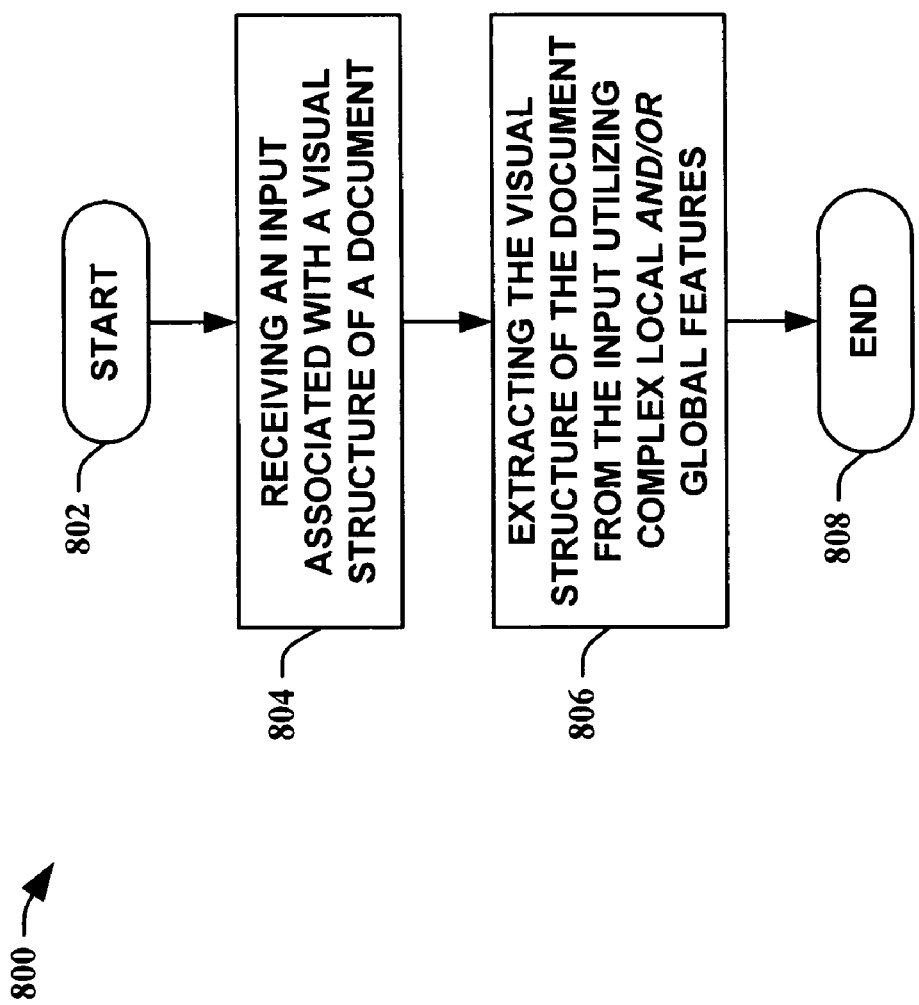
FIG. 8 is another flow diagram of a method of facilitating document visual structure analysis in accordance with an aspect of an embodiment.

In view of the exemplary systems shown and described above, methodologies that may be implemented in accordance with the embodiments will be better appreciated with reference to the flow charts of FIGS. 7 and 8. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

In FIG. 7, a flow diagram of a method 700 of facilitating document visual structure analysis in accordance with an aspect of an embodiment is shown. The method 700 starts 702 by receiving an input associated with a visual structure of a document 704. A grammatical parsing process is then applied to an inference of the document visual structure 706, ending the flow 708. The grammatical parsing process can include, but is not limited to, processes employing machine learning and the like to construct classifiers that facilitate a grammatical cost function. The machine learning can include, but is not limited to, conventional machine learning techniques such as for example, perceptron-based techniques and the like.

Turning to FIG. 8, another flow diagram of a method 800 of facilitating document visual structure analysis in accordance with an aspect of an embodiment is depicted. The method 800 starts 802 by receiving an input associated with a visual structure of a document 804. The visual structure of the document is then extracted from the input utilizing complex local and/or global features 806, ending the flow 808. Various optional mechanisms can be utilized to augment the visual structure extraction including, but not limited to, machine learning, parse boosting, fast features, and/or image scoring and the like. For example, machine learning can facilitate the parsing in order to generate a chart. The chart can then be converted into a subsequent set of labeled examples that are relayed to a classification process. The classification process can utilize the subsequent set of labeled examples along with the machine learning to train a set of classifiers. The classification process can then determine identifying properties between positive and negative examples. The identifying properties allow classifiers to facilitate in assigning proper costs to correct and/or incorrect parses.

Similarly, the parse boosting can be provided to the parsing process to facilitate in learning correct parses more efficiently. A fast feature process can be provided to compute parse images via computation of integral images of document features and/or utilization of constellations of integral images to enhance the parsing efficiency. An image scoring process can facilitate parsing by providing scores of parsed images for a cost function utilized for parsing.

Figure 9:
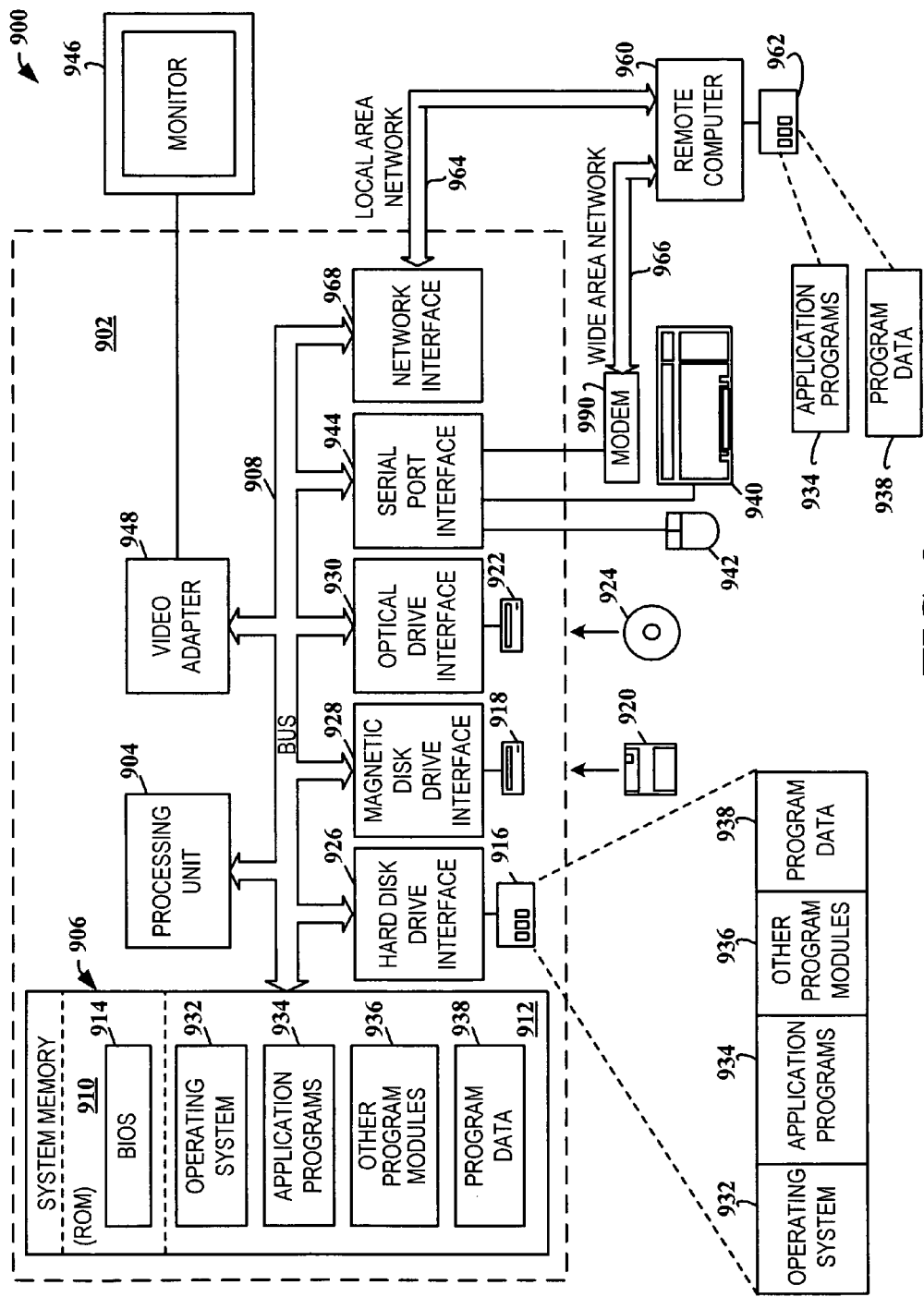
FIG. 9 illustrates an example operating environment in which an embodiment can function.

In order to provide additional context for implementing various aspects of the embodiments, FIG. 9 and the following discussion is intended to provide a brief, general description of a suitable computing environment 900 in which the various aspects of the embodiments may be implemented. While the embodiments have been described above in the general context of computer-executable instructions of a computer program that runs on a local computer and/or remote computer, those skilled in the art will recognize that the embodiments may also be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the embodiments may also be practiced in distributed computing environments where certain tasks are performed by remote processing devices that are linked through a communications network. However, some, if not all, aspects of the embodiments may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 9, an exemplary system environment 900 for implementing the various aspects of the embodiments include a conventional computer 902, including a processing unit 904, a system memory 906, and a system bus 908 that couples various system components, including the system memory, to the processing unit 904. The processing unit 904 may be any commercially available or proprietary processor. In addition, the processing unit may be implemented as multi-processor formed of more than one processor, such as may be connected in parallel.

The system bus 908 may be any of several types of bus structure including a memory bus or memory controller, a peripheral bus, and a local bus using any of a variety of conventional bus architectures such as PCI, VESA, Microchannel, ISA, and EISA, to name a few. The system memory 906 includes read only memory (ROM) 910 and random access memory (RAM) 912. A basic input/output system (BIOS) 914, containing the basic routines that help to transfer information between elements within the computer 902, such as during start-up, is stored in ROM 910.

The computer 902 also may include, for example, a hard disk drive 916, a magnetic disk drive 918, e.g., to read from or write to a removable disk 920, and an optical disk drive 922, e.g., for reading from or writing to a CD-ROM disk 924 or other optical media. The hard disk drive 916, magnetic disk drive 918, and optical disk drive 922 are connected to the system bus 908 by a hard disk drive interface 926, a magnetic disk drive interface 928, and an optical drive interface 930, respectively. The drives 916-922 and their associated computer-readable media provide nonvolatile storage of data, data structures, computer-executable instructions, etc. for the computer 902. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 900, and further that any such media may contain computer-executable instructions for performing the methods of the embodiments.

A number of program modules may be stored in the drives 916-922 and RAM 912, including an operating system 932, one or more application programs 934, other program modules 936, and program data 938. The operating system 932 may be any suitable operating system or combination of operating systems. By way of example, the application programs 934 and program modules 936 can include a recognition scheme in accordance with an aspect of an embodiment.

A user can enter commands and information into the computer 902 through one or more user input devices, such as a keyboard 940 and a pointing device (e.g., a mouse 942). Other input devices (not shown) may include a microphone, a joystick, a game pad, a satellite dish, a wireless remote, a scanner, or the like. These and other input devices are often connected to the processing unit 904 through a serial port interface 944 that is coupled to the system bus 908, but may be connected by other interfaces, such as a parallel port, a game port or a universal serial bus (USB). A monitor 946 or other type of display device is also connected to the system bus 908 via an interface, such as a video adapter 948. In addition to the monitor 946, the computer 902 may include other peripheral output devices (not shown), such as speakers, printers, etc.

It is to be appreciated that the computer 902 can operate in a networked environment using logical connections to one or more remote computers 960. The remote computer 960 may be a workstation, a server computer, a router, a peer device or other common network node, and typically includes many or all of the elements described relative to the computer 902, although for purposes of brevity, only a memory storage device 962 is illustrated in FIG. 9. The logical connections depicted in FIG. 9 can include a local area network (LAN) 964 and a wide area network (WAN) 966. Such networking environments are commonplace in offices, enterprise-wide computer networks, intranets and the Internet.

When used in a LAN networking environment, for example, the computer 902 is connected to the local network 964 through a network interface or adapter 968. When used in a WAN networking environment, the computer 902 typically includes a modem (e.g., telephone, DSL, cable, etc.) 970, or is connected to a communications server on the LAN, or has other means for establishing communications over the WAN 966, such as the Internet. The modem 970, which can be internal or external relative to the computer 902, is connected to the system bus 908 via the serial port interface 944. In a networked environment, program modules (including application programs 934) and/or program data 938 can be stored in the remote memory storage device 962. It will be appreciated that the network connections shown are exemplary and other means (e.g., wired or wireless) of establishing a communications link between the computers 902 and 960 can be used when carrying out an aspect of an embodiment.

In accordance with the practices of persons skilled in the art of computer programming, the embodiments have been described with reference to acts and symbolic representations of operations that are performed by a computer, such as the computer 902 or remote computer 960, unless otherwise indicated. Such acts and operations are sometimes referred to as being computer-executed. It will be appreciated that the acts and symbolically represented operations include the manipulation by the processing unit 904 of electrical signals representing data bits which causes a resulting transformation or reduction of the electrical signal representation, and the maintenance of data bits at memory locations in the memory system (including the system memory 906, hard drive 916, floppy disks 920, CD-ROM 924, and remote memory 962) to thereby reconfigure or otherwise alter the computer system's operation, as well as other processing of signals. The memory locations where such data bits are maintained are physical locations that have particular electrical, magnetic, or optical properties corresponding to the data bits.

Figure 10:
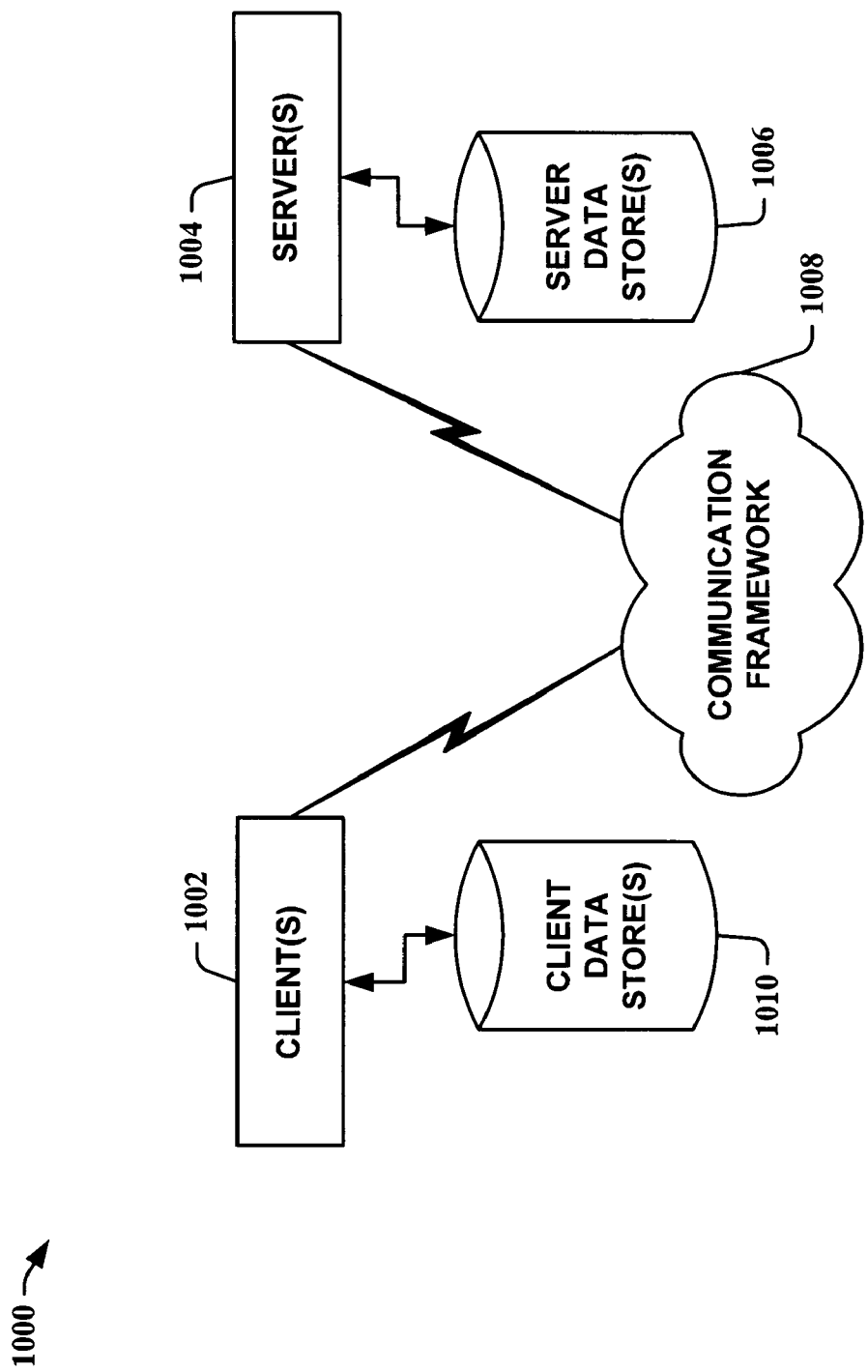
FIG. 10 illustrates another example operating environment in which an embodiment can function.

FIG. 10 is another block diagram of a sample computing environment 1000 with which embodiments can interact. The system 1000 further illustrates a system that includes one or more client(s) 1002. The client(s) 1002 can be hardware and/or software (e.g., threads, processes, computing devices). The system 1000 also includes one or more server(s) 1004. The server(s) 1004 can also be hardware and/or software (e.g., threads, processes, computing devices). One possible communication between a client 1002 and a server 1004 may be in the form of a data packet adapted to be transmitted between two or more computer processes. The system 1000 includes a communication framework 1008 that can be employed to facilitate communications between the client(s) 1002 and the server(s) 1004. The client(s) 1002 are connected to one or more client data store(s) 1010 that can be employed to store information local to the client(s) 1002. Similarly, the server(s) 1004 are connected to one or more server data store(s) 1006 that can be employed to store information local to the server(s) 1004.

It is to be appreciated that the systems and/or methods of the embodiments can be utilized in recognition facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates recognition of document layout structures, comprising:
 a processor that executes the following computer executable components:
  a receiving component that receives an input associated with a visual structure of a document; and
  a grammar component that employs, at least in part, a discriminative grammatical hierarchical structure model of the visual structure of the document to facilitate grammatically parsing the input by associating a plurality of grammatical rules to a plurality of symbol types identified in the visual structure of the document, wherein the grammatical rules comprise a relationship between a paragraph of a natural language and a sub-part of the paragraph and further comprise a relationship between a mathematical expression and a sub-part of the mathematical expression, the discriminative grammatical hierarchical structure model includes hierarchical information associated with at least one of pages, sections, columns, paragraphs, lines, authors, titles, footnotes, or words of the document, wherein grammatically parsing the input is based at least in part on a grammatical cost function; wherein the grammatical cost function is derived, at least in part, via a machine learning technique that facilitates determining an optimal parse tree of the document from a global search of the document, and wherein grammatically parsing the input comprises:
  representing the visual structure of the document as a plurality of integral images;
  utilizing a plurality of constellations of the plurality of integral images to enhance a parsing efficiency of determining the optimal parse tree, wherein the plurality of constellations includes at least one document feature for a white space rectangle; and
  scoring the plurality of integral images to facilitate the grammatical cost function in determining the optimal parse tree.

2. The system of claim 1, the grammar component further comprising a document structure extraction component that extracts a layout structure associated with the document utilizing at least one of local or global features.

3. The system of claim 2, the document structure extraction component utilizing at least one of image scoring, parse learning boosting, or fast features to facilitate extracting the document layout structure.

4. The system of claim 3, the grammar component further comprising:
  a parsing component that employs at least one classifier to facilitate determining the optimal parse tree from the global search.

5. The system of claim 4, the parsing component employs the classifier to facilitate determining a grammatical cost function.

6. The system of claim 5, the classifier comprising a classifier trained via a conventional machine learning technique.

7. The system of claim 6, the machine learning technique comprising, at least in part, a perceptron-based technique.

8. The system of claim 2, the document structure extraction component utilizing machine learning to facilitate extracting the document layout structure.

9. The system of claim 1, the grammar component employs, at least in part, dynamic programming to determine a globally optimal parse tree for the input.

10. A recognition system employing the system of claim 1 to facilitate at least one of importing or exporting document visual structures.

11. One or more computer-readable storage media containing computer-executable instructions that, when executed on a computer, perform acts comprising:
  facilitating recognition of document layout structures, comprising:
    receiving an input associated with a visual structure of a document; and
    applying a grammatical parsing process to an inference of the document visual structure, the inference of the document visual structure includes at least one of inferred pages, sections, columns, paragraphs, lines or words of the document, the grammatical parsing process based on grammatical rules comprising a relationship between a paragraph of a natural language and a sub-part of the paragraph and further comprising a relationship between a mathematical expression and a sub-part of the mathematical expression, wherein the grammatical parsing process comprises:
      parsing the input based at least in part on a grammatical cost function; the grammatical cost function derived, at least in part, via a machine learning technique that facilitates determining an optimal parse tree of the document from a global search of the document;
      representing the visual structure of the document as a plurality of integral images;
      utilizing a plurality of constellations of the plurality of integral images to enhance a parsing efficiency of determining the optimal parse tree, wherein the plurality of constellations includes at least one document feature for a white space rectangle; and
      scoring the plurality of integral images to facilitate the grammatical cost function in determining the optimal parse tree.

12. The one or more computer-readable storage media as recited in claim 11 further comprising:
  employing, at least in part, a grammatical hierarchical structure model of the visual structure of the document to facilitate grammatically parsing the document visual structure input, the grammatical hierarchical structure model includes hierarchical information associated with least one of pages, sections, columns, paragraphs, lines or words of the document.

13. The one or more computer-readable storage media as recited in claim 11, wherein the grammatical parsing process is based on a discriminative grammatical model.

14. The one or more computer-readable storage media as recited in claim 11 further comprising: computing at least one of the integral images of at least one document feature or at least one of the constellations of the plurality of integral images to facilitate parsing the input.

15. The one or more computer-readable storage media as recited in claim 11 further comprising:
  utilizing AdaBoost to facilitate parsing the input.

16. A device employing the one or more computer-readable storage media as recited in claim 11, the device comprising a computer, a server, or a handheld electronic device.

17. A computer-implemented method of document layout structure recognition, comprising:
  receiving from an input device coupled to a processor and memory an input associated with a visual structure of a document stored in the memory; and
  employing, at least in part, a grammatical model of the visual structure of the document stored in the memory to facilitate grammatically parsing the visual structure input, the grammatical model includes hierarchical information associated with at least one of pages, sections, columns, paragraphs, lines, or words of the document, wherein the grammatical rules comprise a relationship between a paragraph of a natural language and a sub-part of the paragraph and further comprise a relationship between a mathematical expression and a sub-part of the mathematical expression, wherein grammatically parsing the visual structure input of the document is based at least in part on a grammatical cost function; the grammatical cost function derived, at least in part, via a machine learning technique that facilitates determining a parse tree of the document from a global search of the document;
  representing the visual structure of the document as a plurality of integral images; and
  utilizing a plurality of constellations of the plurality of integral images to enhance a parsing efficiency of determining the parse tree, wherein the plurality of constellations includes at least one document feature for white space in the document.

18. The computer-implemented method of claim 17 further comprising:
  parsing the visual structure input utilizing at least one classifier trained via a machine learning technique.

19. A system that facilitates recognition of document layout structures, comprising:
a processor;
a memory communicatively coupled to the processor, the memory having stored therein computer-executable instructions configured to implement the document layout structure recognition system including:
a receiving component that receives an input associated with a visual structure of a document, the visual structure associated with at least one of formatting, spacing, orientation of text, titles, authors, mathematical formulas, sections, columns, paragraphs or pictures of the document;
a grammar component that employs, at least in part, a discriminative grammatical hierarchical structure model of the visual structure of the document to facilitate grammatically parsing the input by associating a plurality of grammatical rules to a plurality of symbol types identified in the visual structure of the document, wherein each symbol type has an associated grammatical rule that describes a terminal, the terminal comprising a character, digit, or symbol of text, wherein the grammatical rules comprise a relationship between a paragraph of a natural language and a sub-part of the paragraph and further comprise a relationship between a mathematical expression and a sub-part of the mathematical expression, the discriminative grammatical hierarchical structure model includes hierarchical information associated with at least one of pages, sections, columns, paragraphs, lines, or words of the document, wherein grammatically parsing the input is based at least in part on a grammatical cost function; the grammatical cost function derived, at least in part, via a machine learning technique that facilitates determining a parse tree of the document from a global search of the document;
a document structure extraction component that extracts a layout structure associated with the document utilizing at least one of local or global features, the document structure extraction component employs machine learning to facilitate extracting the document layout structure; and
a fast feature mechanism that computes a plurality of integral images corresponding to elements of the visual structure of the document, and that utilizes a plurality of constellations of the plurality of integral images to enhance a parsing efficiency of determining the parse tree, wherein the plurality of constellations includes at least one document feature for white space in the document.

* * * * *